(12) United States Patent
Chen

(10) Patent No.: US 8,302,940 B2
(45) Date of Patent: Nov. 6, 2012

(54) ENERGY-SAVING AND WIND-POWERED AERATOR

(75) Inventor: Shih-Hsiung Chen, Yongkang (TW)

(73) Assignee: Jetpro Technology, Inc., Tainan County (TW)

( * ) Notice: Subject to any disclaimer, the term of this patent is extended or adjusted under 35 U.S.C. 154(b) by 399 days.

(21) Appl. No.: 12/760,508

(22) Filed: Apr. 14, 2010

(65) Prior Publication Data
US 2010/0320626 A1 Dec. 23, 2010

(30) Foreign Application Priority Data

Jun. 19, 2009 (TW) .............................. 98211067 U

(51) Int. Cl.
*B01F 3/04* (2006.01)
(52) U.S. Cl. .............................. 261/35; 261/92; 261/120
(58) Field of Classification Search ..................... 261/35, 261/91, 92, 120; 210/242.2
See application file for complete search history.

(56) References Cited

U.S. PATENT DOCUMENTS

| | | | | |
|---|---|---|---|---|
| 3,373,821 A | * | 3/1968 | Sare | 416/171 |
| 3,627,446 A | * | 12/1971 | Wade et al. | 416/91 |
| 3,822,740 A | * | 7/1974 | Hackett | 165/45 |
| 3,908,753 A | * | 9/1975 | Balch | 165/299 |
| 4,030,859 A | * | 6/1977 | Henegar | 417/61 |
| 4,179,243 A | * | 12/1979 | Aide | 417/61 |
| 4,292,540 A | * | 9/1981 | Thompson et al. | 290/55 |
| 4,308,137 A | * | 12/1981 | Freeman | 210/194 |
| 4,366,779 A | * | 1/1983 | Knecht | 122/26 |
| 4,764,313 A | * | 8/1988 | Cameron et al. | 261/35 |
| 5,549,828 A | * | 8/1996 | Ehrlich | 210/602 |
| 7,397,144 B1 | * | 7/2008 | Brostmeyer et al. | 290/53 |

FOREIGN PATENT DOCUMENTS

| | | | |
|---|---|---|---|
| DE | 3401 119 A1 | * | 7/1985 |
| GB | 2 249 355 A | * | 5/1992 |
| JP | 1-253572 | * | 10/1989 |
| RU | 2 079 451 C1 | * | 5/1997 |

* cited by examiner

*Primary Examiner* — Charles Bushey
(74) *Attorney, Agent, or Firm* — Chun-Ming Shih; HDLS IPR Services

(57) ABSTRACT

An energy-saving and wind-powered aerator includes a floating carrier (1), a wind turbine (2), a water stirrer (3), and a transmission element (4). The floating carrier (1) has a supporting structure (12). The wind turbine (2) is connected to an upper portion of the supporting structure (12). The water stirrer (3) is mounted to the floating carrier (1). The transmission element (4) is connected to the wind turbine (2) and the water stirrer (3). The water stirrer (3) is rotated by means of the rotation of the wind turbine (2) and a driving action of the transmission element (4). With this arrangement, the wind turbine (2) is blown by natural and inexhaustible wind to rotate, so that the water stirrer (3) can be driven by the transmission element (4) to beat water rapidly, thereby increasing the amount of oxygen dissolved in the water and facilitating the decomposition of organic compounds in the water. In this way, the water quality can be improved and the amount of electricity consumed in aquaculture industries can be reduced to increase the profit.

7 Claims, 7 Drawing Sheets

ENERGY-SAVING AND WIND-POWERED AERATOR

BACKGROUND OF THE INVENTION

1. Field of the Invention The present invention relates to an aerator, and in particular to an energy-saving and wind-powered aerator capable of utilizing wind power as a driving power.

2. Description of Prior Art

As for aquaculture industries, eutrophication, acidification, and large amount of oxygen consumption in water have an important effect on their profit. If the water quality is to be improved, the amount of oxygen dissolved in the water is one of the most important conditions. However, when the external air is merely brought into direct contact with the water surface, the amount of oxygen dissolved in the water is insufficient. Although aquatic plants carry out photosynthesis in daytimes to increase the amount of oxygen dissolved in the water, the aquatic plants carry out respiration to consume oxygen, so that the amount of oxygen dissolved in the water is reduced. If the amount of oxygen dissolved in the water is lower than a limit value, micro-organisms cannot decompose organic pollutants in the water, so that the water becomes an anaerobic state. Therefore, an aerator is needed to increase the amount of oxygen dissolved in the water, make the water running, and uniformly distribute the dissolved oxygen in the water. With the aerator, the decomposition of organic compounds can be carried out in the water to improve the water quality, thereby preventing the aquaculture biology from death due to insufficient oxygen.

The aerators may be configured as several types, such as an impeller type, a waterwheel type, a water-circulating type, a pumping type or the like. The water-circulating type or impeller type aerator is the most popular aerator for the aquaculture industries. These two kinds of aerators can improve the pond conditions, circulate the water vertically in the pond, and increase the amount of oxygen dissolved in the water with less damage of the aquaculture biology. The time and frequency of using the aerator are dependent on the density of the aquaculture biology in the water, the conditions of water, seasons of growth, and changes in climates. In any event, the amount of electricity consumed by the aerator is large after a long period of use, so that the high electricity fee increases the production cost of the aquaculture industry. If any natural and inexhaustible energy or resource can be used to drive the aerator, the amount of electricity can be reduced to conserve the resources in the earth. Furthermore, the profit of the aquaculture industry can be increased by reducing the electricity fee.

In view of the above, the present inventor proposes a novel aerator based on his expert experience and delicate researches.

SUMMARY OF THE INVENTION

The present invention is to provide an energy-saving and wind-powered aerator, in which a wind turbine is blown by the wind to rotate so as to drive a water stirrer to beat water rapidly, thereby increasing the amount of oxygen dissolved in the water. In this way, the aerator can be operated without consuming electricity by using a simple structure, thereby generating a high economical benefit.

The present invention is to provide an energy-saving and wind-powered aerator, which includes a floating carrier, a wind turbine, a water stirrer, and a transmission element. The floating carrier comprises a supporting structure. The wind turbine is connected to an upper portion of the supporting structure. The water stirrer is mounted on the floating carrier. The transmission element is connected to the wind turbine and the water stirrer. The water stirrer is rotated by means of the rotation of the wind turbine and a driving action of the transmission element.

With this arrangement, natural wind can be used as the power for rotating the wind turbine. The transmission element transmits the rotating energy of the wind turbine to drive the water stirrer to beat water rapidly, thereby increasing the amount of oxygen dissolved in water. In this way, organic compounds can be decomposed in the water to improve the water quality. Since the natural wind is inexhaustible in supply and always available for use, using wind as the power for the aerator, the amount of electricity consumed in aquaculture industry can be reduced to increase its profit. The fuels consumed by a power plant for generating electricity can be also reduced to conserve the resources in the earth. The present invention is simple in structure, easy to manufacture, low in price, effective in converting the wind power into a force for stirring water, and excellent in economical benefit. Further, the wind turbine can be automatically adjusted to the wind direction to utilize the wind power more efficiently.

DETAILED DESCRIPTION OF THE INVENTION

The detailed description and technical contents of the present invention will be explained in more detail with reference to an preferred embodiment thereof shown in the accompanying drawings. However, it should be understood that the drawings are illustrative only, but not used to limit the scope of the present invention.

Figure 1:
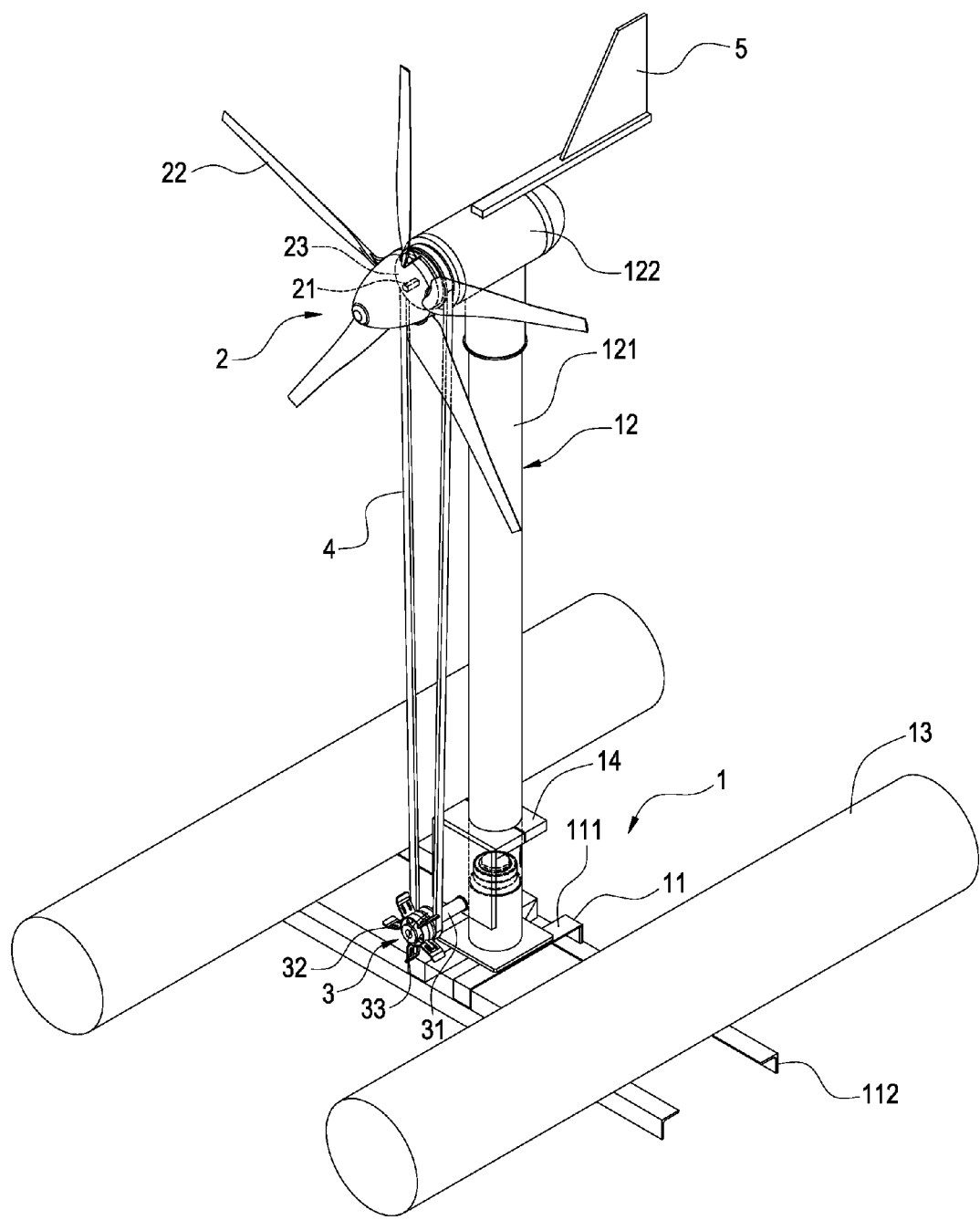
FIG. 1 is an assembled perspective view of the present invention.

Please refer to FIG. 1. The present invention provides an energy-saving and wind-powered aerator, which includes a floating carrier 1, a wind turbine, a water stirrer 3, and a transmission element 4.

The floating carrier 1 has a bearing base 11. The bearing base 11 comprises a mounting block 111 and a connecting rod 112 connecting to the bottom surface of the bearing mounting block 111. The surface of the mounting block 111 is connected to an upright supporting structure 12. The surfaces on both ends of the connecting rod 112 are provided with a pair of cylindrical buoys 13. The supporting structure 12 comprises a longitudinal post 121 connected to the top surface of the mounting block 111 and a transverse post 122 fixed to the top of the longitudinal post 121. The lower portion of the longitudinal post 121 is sheathed by an adjustment plate 14.

The wind turbine 2 comprises a spindle 21 pivotally connected to the front end of the transverse post 122 and a blade 22 fixedly connected to the spindle 21. A first belt pulley 23 is provided on the spindle 21 between the transverse post 122 and the blade 22.

Figure 2:
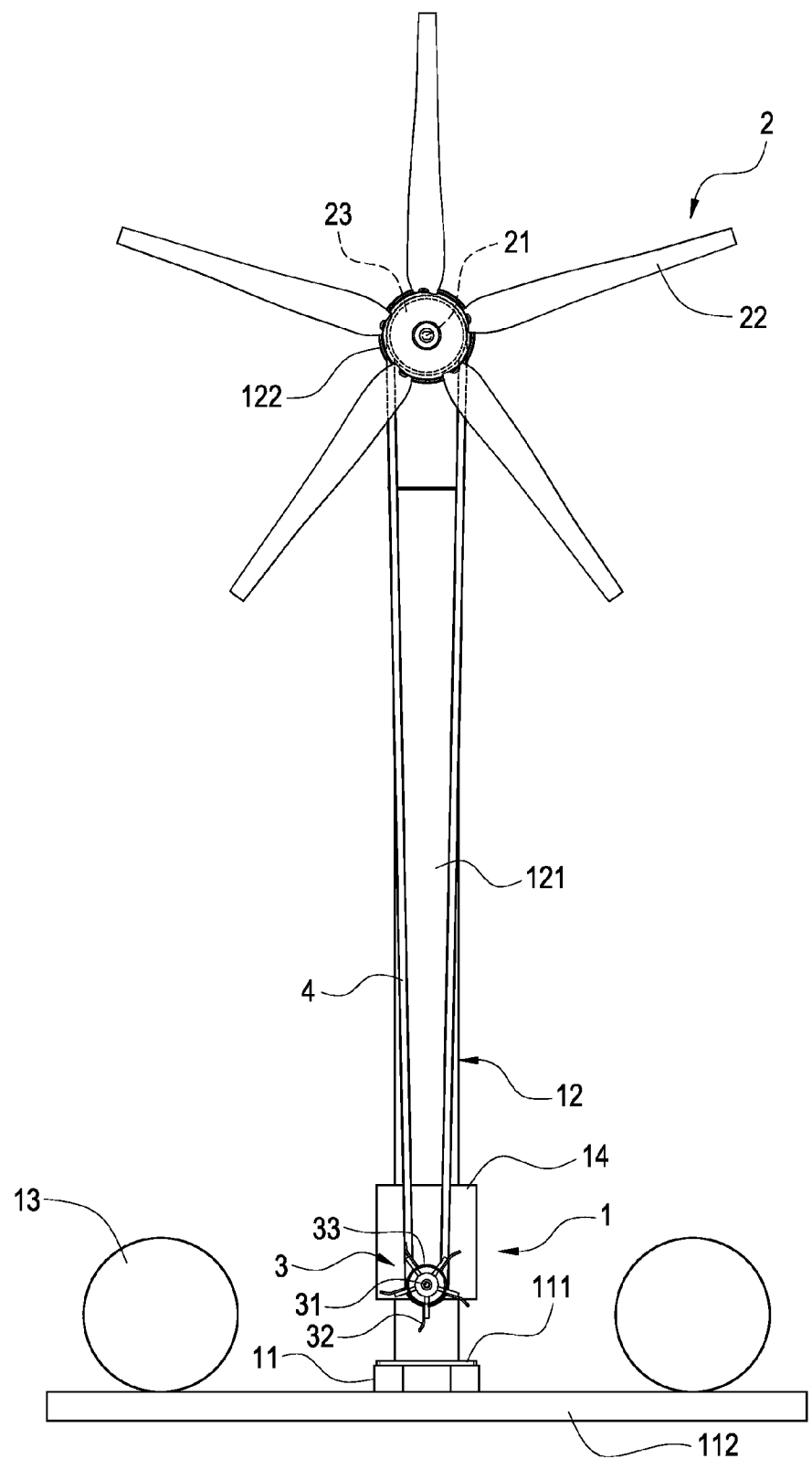
FIG. 2 is a front view of FIG. 1.
Figure 3:
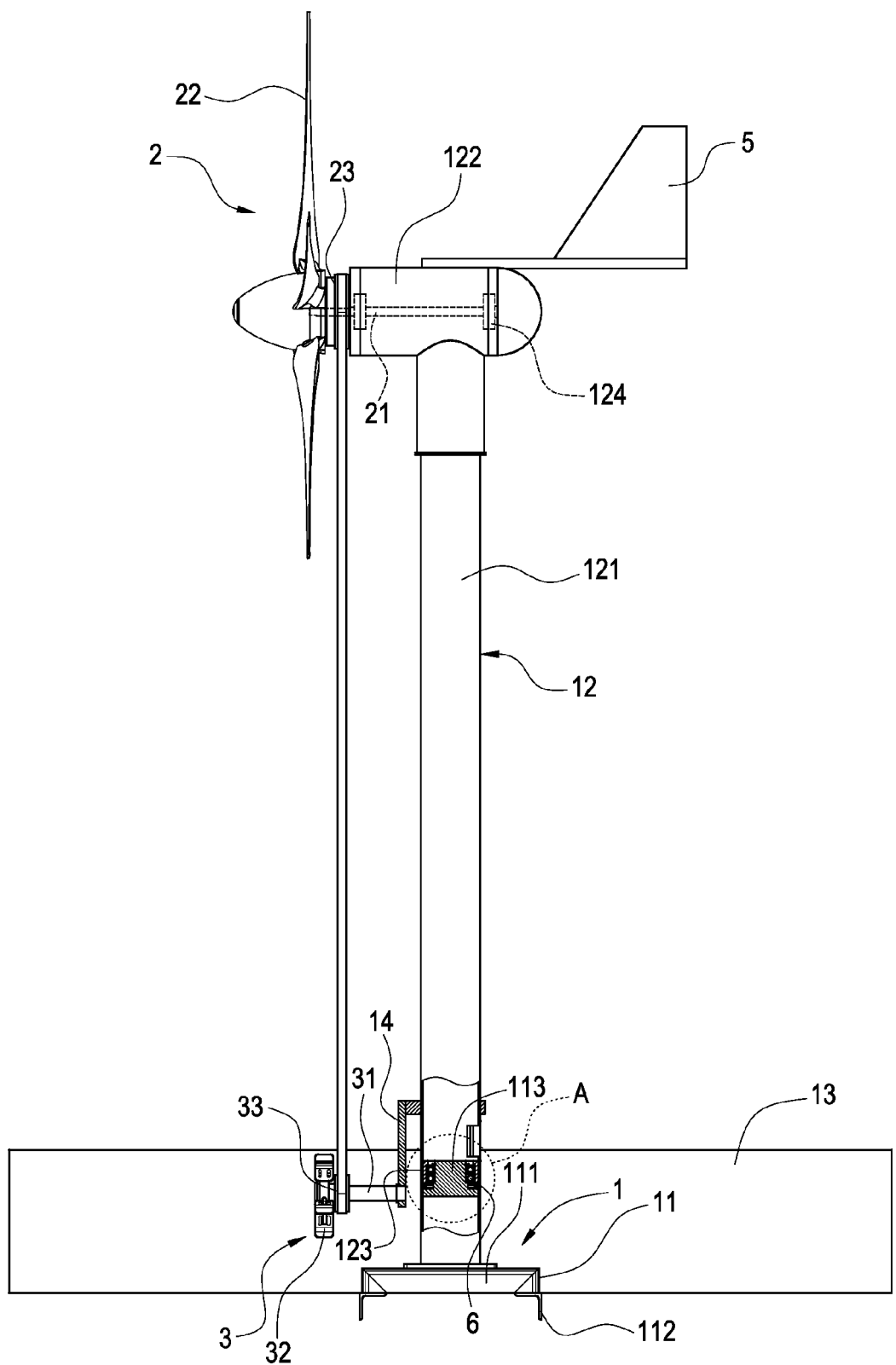
FIG. 3 is a side and partially cross-sectional view of the present invention.

The water stirrer 3 comprises a shaft 31 pivotally connected to the front end of the adjustment plate 14 and an impeller 32 fixedly connected to the shaft 31. The axial line of shaft 31 is parallel to the axial line of the spindle 21 (as shown in FIGS. 2 and 3). A second belt pulley 33 is provided on the shaft 31 between the adjustment plate 14 and the impeller 32.

The transmission element 4 is a belt for tightly surrounding the first belt pulley 23 and the second belt pullet 33.

Figure 4:
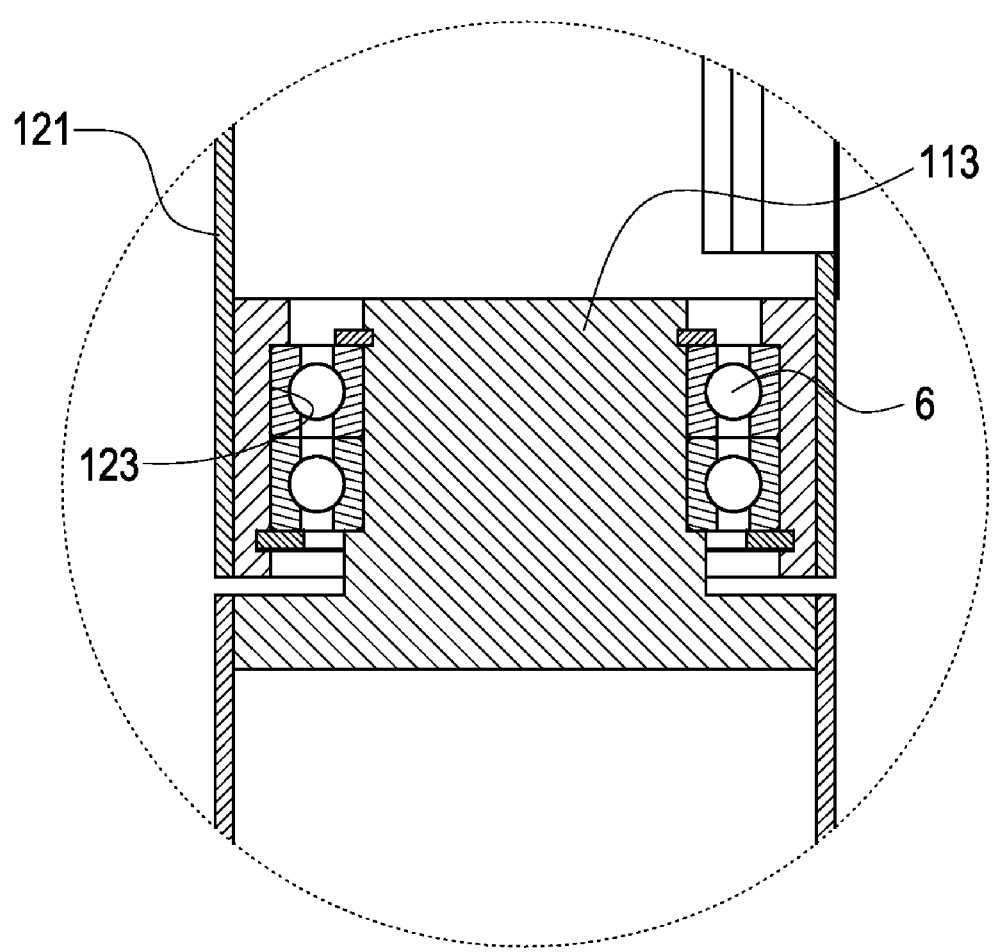
FIG. 4 is an enlarged view of the portion A in FIG. 3.

Please refer to FIG. 3. The present invention includes a pair of blade bearings 124, a rudder 5 and a bearing 6. The pair of blade bearings 124 is mounted inside the transverse post 122. The spindle 21 penetrates the blade bearings 124 to rotate therein. The rudder 5 is fixed at the rear end of the transverse post 122. The top surface of the mounting block 111 is formed with a protruding shaft 113. The bottom end of the longitudinal post 121 is provided with a shaft hole 123. The protruding shaft 113 penetrates the shaft hole 123 to rotate therein. The bearing 6 is inserted into the shaft hole 123 to sheath the protruding shaft 113, as shown in FIG. 4 which is an enlarged view of the portion A in FIG. 3. With this arrangement, the bearing 6 allows the supporting structure 12 to rotate with respect to the bearing base 11.

Figure 5:
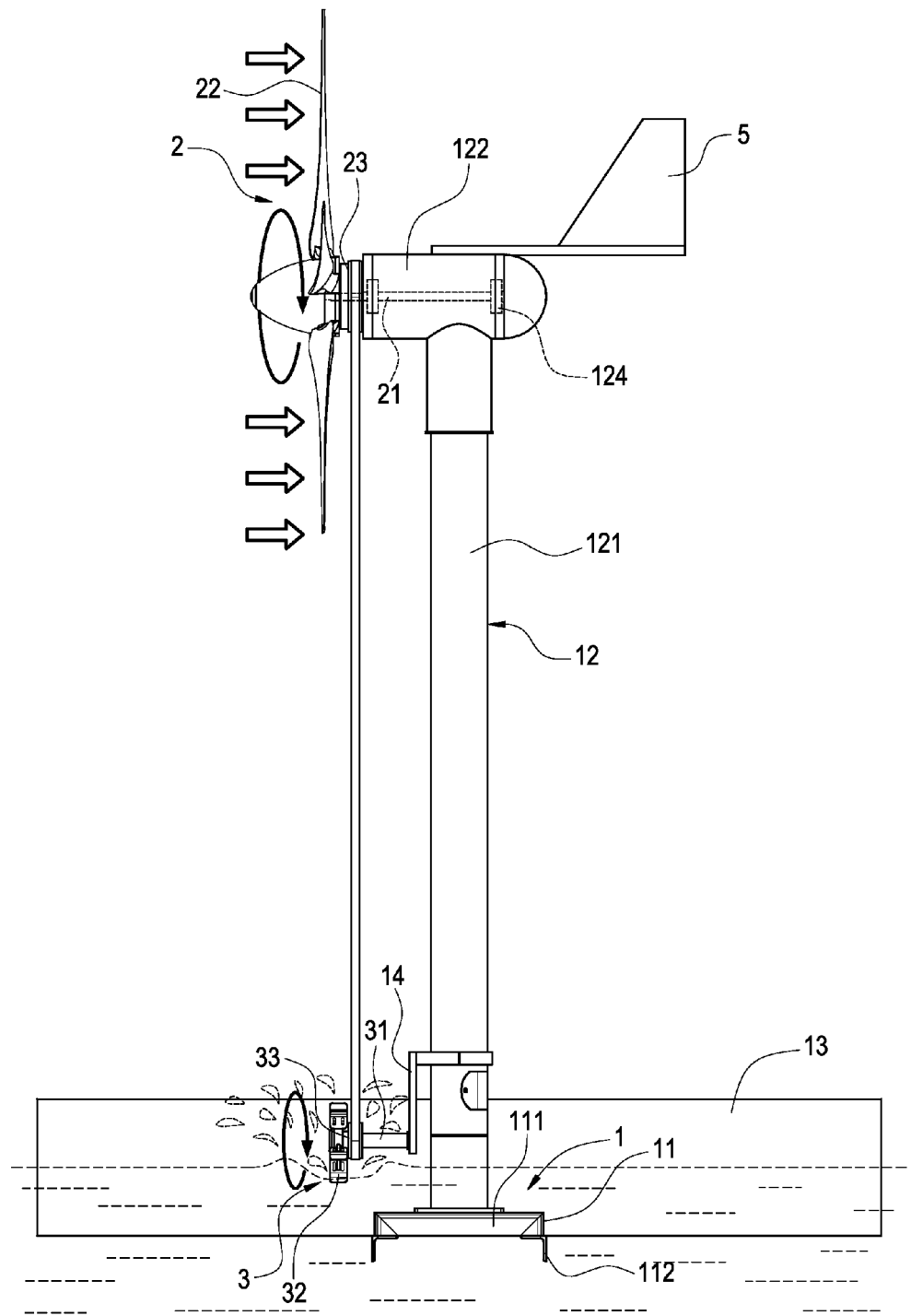
FIG. 5 is a side view of the present invention in stirring water by using the wind power.

Please refer to FIG. 5. The energy-saving and wind-powered aerator floats on the water by means of the buoyancy of the buoys 13. The lower-half portion or a portion of the impeller 32 of the water stirrer 3 is sunk under the water, while the upper-half portion of the impeller 32 is displayed over the water. The wind turbine 2 has a horizontal spindle to thereby generate a higher wind-power utilization coefficient and a torque. The blade 22 is blown by the wind, so that the aerodynamic action of the wind generates a torque to the blade 22 so as to cause the blade 22 to rotate. As a result, the spindle 21 and the first belt pulley 33 rotate synchronously with the blade 22. Then, the first belt pulley 23 drives the second belt pulley 33 by means of the driving action of the transmission element 4. The second belt pulley 33 then drives the shaft 31 and the impeller 32 to rotate synchronously therewith. The rotating impeller 32 continuously beats the water to bring more air into the water, thereby generating tiny bubbles to be mixed with the water. In this way, the amount of oxygen dissolved in the water can be increased.

According to the principle of flexible transmission, the rotating speed of a belt pulley is inverse proportional to its diameter. The diameter of the first belt pulley 23 is larger than that of the second belt pulley 33. Thus, the rotating speed of the second belt pulley 33 is larger than that of the first belt pulley 23. That means that the rotating speed of the impeller 32 is larger than that of the blade 22. Once the wind turbine 2 is blown by the wind, the water stirrer 3 can be driven to beat the water rapidly, thereby converting the wind power into the water-stirring capability efficiently. After the aerator is used for a period of time, the transmission element 4 may slacken. At this time, the adjustment plate 14 sheathed on the longitudinal post 121 can be moved downwards to tighten the transmission element 4 again, thereby keeping the transmission force of the transmission element 4 in an allowable range.

Figure 6:
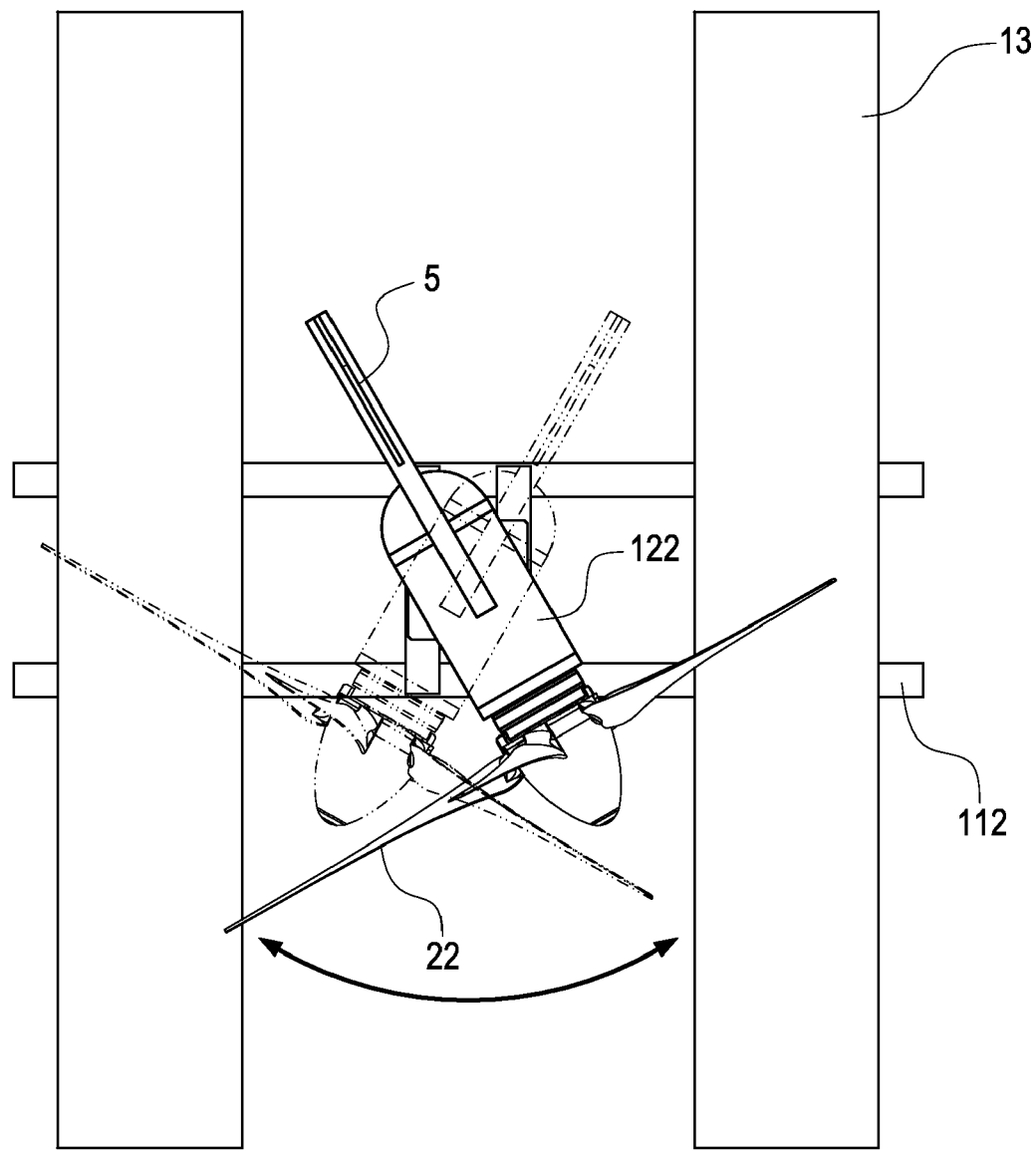
FIG. 6 is a top view of the present invention with its automatic adjustment to wind direction.
Figure 7:
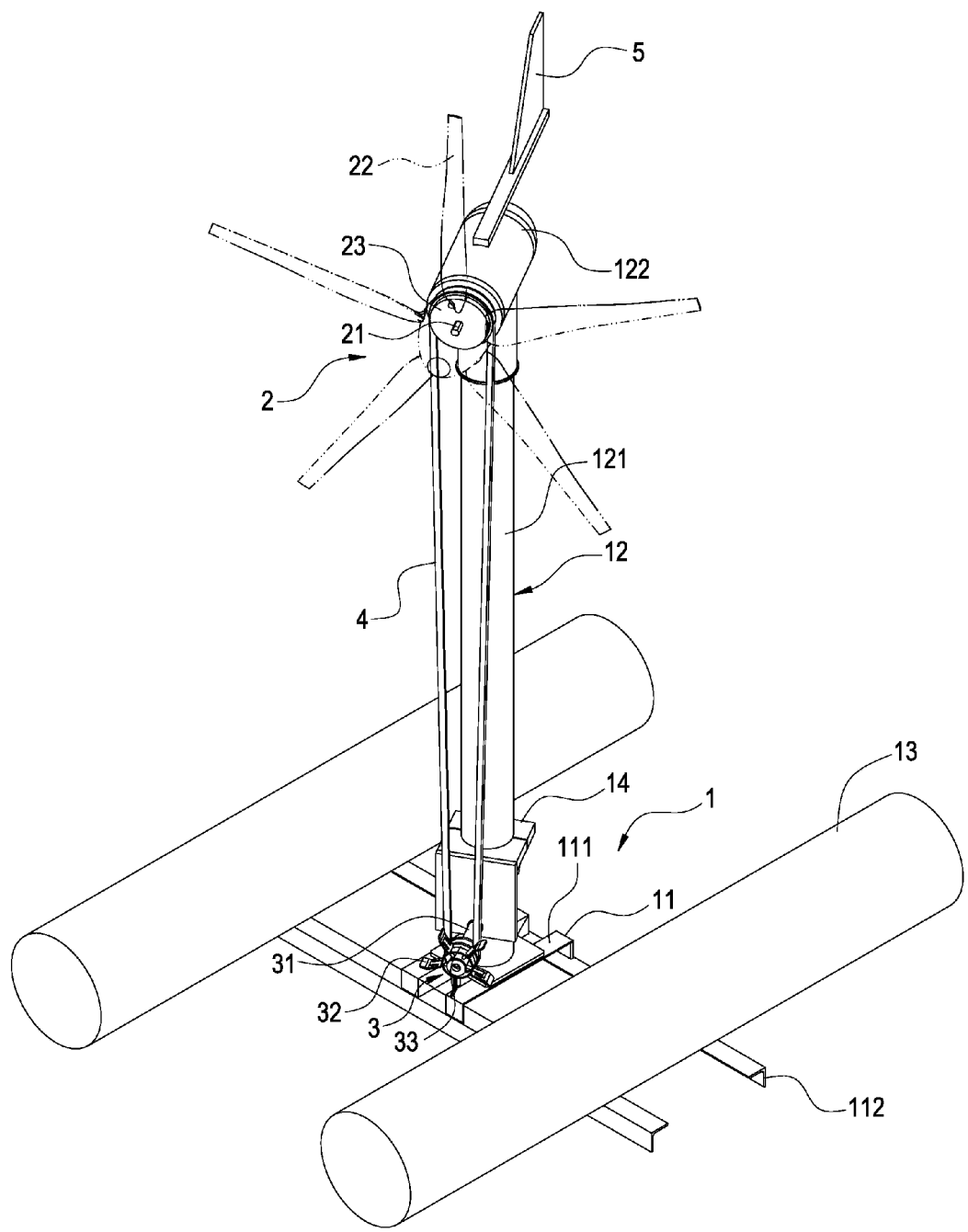
FIG. 7 is an assembled perspective view of the present invention with its automatic adjustment to wind direction.

Please refer to FIG. 6. Since the wind direction is changeable together with the change of seasons or climates, the rudder 5 is used to adjust the blade 22 to the wind direction at any time, thereby utilizing the wind power more efficiently. Please refer to FIG. 7, showing a case in which the blade 22 is adjusted to the wind direction. The wind turbine 2 is fixed on the supporting structure 12 and the supporting structure 12 can spin with respect to the protruding shaft 113 owing to the arrangement of the shaft hole 123 and the bearing 6. Furthermore, the spindle 21 and the shat 31 are mounted on the supporting structure 12, so that the spinning of the supporting structure 12 can cause the spindle 21 and the shaft 31 to synchronously revolve around the supporting structure 12, thereby keeping the axial line of the spindle 21 to be parallel to the axial line of the shaft 31. The first belt pulley 23 is fixedly sheathed on the spindle 21, and the second belt pulley 33 is fixedly sheathed on the shaft 31, so that the axial line of the first belt pulley 23 is kept in parallel to the axial line of the second belt pulley 33, thereby protecting the transmission element 4, the spindle 21 and the shaft 31 from suffering damage.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An energy-saving and wind-powered aerator, including:
   a floating carrier (1) comprising a supporting structure (12);
   a wind turbine (2) connected to an upper portion of the supporting structure (12);
   a water stirrer (3) mounted on the floating carrier (1); and
   a transmission element (4) connected to the wind turbine (2) and the water stirrer (3);
   wherein the water stirrer (3) is rotated by means of the rotation of the wind turbine (2) and a driving action of the transmission element (4),
   wherein the supporting structure (12) comprises a longitudinal post (121) and a transverse post (122) fixed to the longitudinal post (121),
   wherein the wind turbine (2) comprises a spindle (21) pivotally connected to the transverse post (122) and a blade (22) fixedly connected to the spindle (21), and
   wherein the floating carrier (1) further comprises an adjustment plate (14) sheathed on the longitudinal post (121), the water stirrer (3) comprises a shaft (31) pivotally connected to the adjustment plate (14) and an impeller (32) fixedly connected to the shaft (31), and the spindle (21) and the shaft (31) are parallel to each other.

2. The energy-saving and wind-powered aerator according to claim 1, wherein the floating carrier (1) further comprising a bearing base (11) for allowing the supporting structure (12) to be fixed thereon and a pair of buoys (13) connected to both ends of the bearing base (11).

3. The energy-saving and wind-powered aerator according to claim 2, wherein the bearing base (11) comprises a mounting block (111) for allowing the supporting structure (12) to be fixed thereon and a connecting rod (112) for connecting to the mounting block (111) and the buoys (13).

4. The energy-saving and wind-powered aerator according to claim 1, wherein the wind turbine (2) further comprises a first belt pulley (23) sheathed on the spindle (21), the water stirrer (3) further comprises a second belt pulley (33) sheathed on the shaft (31), and the transmission element (4) is positioned to tightly surround the first belt pulley (23) and the second belt pulley (33).

5. The energy-saving and wind-powered aerator according to claim 4, wherein the transmission element (4) is a belt.

6. The energy-saving and wind-powered aerator according to claim 1, further including a rudder (5) fixed to the transverse post (122), the floating carrier (1) further comprising a bearing base (11), the bearing base (11) comprising a mounting block (111), a top surface of the mounting block (111)

being formed with a protruding shaft (113), a bottom end of the longitudinal post (121) being provided with a shaft hole (123), the protruding shaft (113) penetrating the shaft hole (123) to rotate therein, thereby making the supporting structure (12) to be pivotally rotatable with respect to the bearing base (11).

7. The energy-saving and wind-powered aerator according to claim 6, further including a bearing (6) inserted between the shaft hole (123) and the protruding shaft (113).

* * * * *